United States Patent
van Geel et al.

(10) Patent No.: US 11,489,997 B2
(45) Date of Patent: Nov. 1, 2022

(54) SYSTEM AND METHOD OF PARTIAL MATCHING OF CONTROL SETTINGS ACROSS CAMERAS

(71) Applicant: GRASS VALLEY CANADA, Montreal (CA)

(72) Inventors: Martinus Wilhelmus Cornelis van Geel, Breda (NL); Arie Christiaan Vogel, Breda (NL); Wilhelmus Nicolaas Jozef van Diepen, Zevenbergen (NL)

(73) Assignee: GRASS VALLEY CANADA, Montreal (CA)

( * ) Notice: Subject to any disclaimer, the term of this patent is extended or adjusted under 35 U.S.C. 154(b) by 0 days.

(21) Appl. No.: 17/448,815

(22) Filed: Sep. 24, 2021

(65) Prior Publication Data

US 2022/0014670 A1  Jan. 13, 2022

Related U.S. Application Data (63) Continuation of application No. 16/832,468, filed on Mar. 27, 2020, now Pat. No. 11,134,185.
(Continued)

(51) Int. Cl.
H04N 5/232 (2006.01)

(52) U.S. Cl.
CPC ... H04N 5/23206 (2013.01); H04N 5/232933 (2018.08)

(58) Field of Classification Search
CPC .......... H04N 5/23222; H04N 5/23206; H04N 5/232933; H04N 5/247; H04N 5/23216;
(Continued)

(56) References Cited

U.S. PATENT DOCUMENTS 5,164,827 A  11/1992 Paff
5,434,617 A   7/1995 Bianchi
(Continued)

FOREIGN PATENT DOCUMENTS

JP    2018151949 A    9/2018

OTHER PUBLICATIONS

International Search Report & Written Opinion received in PCT/EP2020/059164 dated Jun. 3, 2020.

*Primary Examiner* — Pritham D Prabhakher
(74) *Attorney, Agent, or Firm* — ArentFox Schiff LLP (57) ABSTRACT

A system is provided for partial matching of settings across cameras. The system includes a camera setting controller that controls control elements of a target camera for capturing video content of a scene. Moreover, a transfer module detects a request to transfer settings from a reference camera to the target camera and a look determiner determines a look of a scene of the video content being captured by the at least one target camera. The transfer module retrieves the control elements of the reference camera and related image capture control settings that correspond to the obtained image capture control settings of the at least one target camera. The transfer module then transfers the image capture control settings of the control elements from the reference camera to the target camera, such that the settings are applied to the target camera to modify the capturing of video content of the scene.

20 Claims, 4 Drawing Sheets

Related U.S. Application Data (60) Provisional application No. 62/827,646, filed on Apr. 1, 2019.

(58) Field of Classification Search
CPC .. H04N 5/268; H04N 5/2628; H04N 5/23212; H04N 5/23254; H04N 5/23296; H04N 5/232; H04N 5/2354; H04N 5/222; H04N 5/23203; H04N 5/23209; H04N 5/262; H04N 21/80; H04N 21/23418; H04N 21/21805; H04N 21/2187; H04N 7/181; G06T 7/571; G06T 2207/10016; G06T 2207/10148; G06T 2207/30221; G06T 2200/04; G06K 9/6202; G06F 17/30268; G06F 3/04883; G06F 3/04886; G08B 13/19693; G08B 13/19676; G08B 13/17671; G08B 13/17636; G08B 13/17667
USPC ........................................................ 348/211.3
See application file for complete search history.

(56) References Cited

U.S. PATENT DOCUMENTS

| | | | |
|---|---|---|---|
| 6,864,911 B1 | 3/2005 | Zhang | |
| 7,990,422 B2 | 8/2011 | Ahiska et al. | |
| 8,184,168 B2 | 5/2012 | Kindborg et al. | |
| 8,488,001 B2* | 7/2013 | Mohanty | G08B 13/19643 |
| | | | 348/143 |
| 8,723,956 B2* | 5/2014 | Anderson | H04N 5/222 |
| | | | 348/157 |
| 9,077,866 B2* | 7/2015 | Aagaard | H04N 5/23206 |
| 9,497,388 B2 | 11/2016 | Huang | |
| 9,521,398 B1 | 12/2016 | Woodman et al. | |
| 9,853,862 B2* | 12/2017 | Ranbro | H04L 41/0886 |
| 10,429,608 B1* | 10/2019 | Baer | G02B 13/22 |
| 10,542,200 B2* | 1/2020 | Suwa | H04N 5/23206 |
| 10,582,108 B2 | 3/2020 | Nassor et al. | |
| 10,678,220 B2 | 6/2020 | Farnik et al. | |
| 10,764,486 B2* | 9/2020 | Lee | H04N 5/232061 |
| 10,911,694 B2 | 2/2021 | Damstra et al. | |
| 10,972,647 B2 | 4/2021 | Setos | |
| 11,022,858 B2* | 6/2021 | Richards | H04N 5/2258 |
| 2006/0056056 A1* | 3/2006 | Ahiska | H04N 7/181 |
| | | | 359/690 |
| 2008/0122949 A1 | 5/2008 | Kindborg et al. | |
| 2012/0038776 A1 | 2/2012 | Ahiska et al. | |
| 2012/0098969 A1 | 4/2012 | Wengrovitz et al. | |
| 2013/0083219 A1 | 4/2013 | Heo et al. | |
| 2013/0336627 A1* | 12/2013 | Calvert | H04L 65/612 |
| | | | 386/224 |
| 2014/0211018 A1 | 7/2014 | de Lima et al. | |
| 2014/0362230 A1 | 12/2014 | Bulan et al. | |
| 2016/0050357 A1 | 2/2016 | Iijima et al. | |
| 2016/0119549 A1 | 4/2016 | Niida | |
| 2016/0143608 A1 | 5/2016 | Schmied et al. | |
| 2016/0147131 A1* | 5/2016 | Richards | H04N 5/232123 |
| | | | 348/187 |
| 2017/0331986 A1 | 11/2017 | Houba et al. | |
| 2018/0041696 A1 | 2/2018 | Balasubramanian et al. | |
| 2018/0070001 A1 | 3/2018 | Nassor et al. | |
| 2018/0270427 A1 | 9/2018 | Damstra et al. | |
| 2019/0104161 A1 | 4/2019 | Meganathan et al. | |
| 2019/0215438 A1* | 7/2019 | Lee | H04N 5/232061 |
| 2019/0253605 A1 | 8/2019 | Setos | |

* cited by examiner

SYSTEM AND METHOD OF PARTIAL MATCHING OF CONTROL SETTINGS ACROSS CAMERAS

CROSS REFERENCE TO RELATED APPLICATIONS

The present application is a continuation of U.S. patent application Ser. No. 16/832,468, filed Mar. 27, 2020, which claims priority to U.S. Patent Provisional Application No. 62/827,646, filed Apr. 1, 2019, the contents of which are hereby incorporated in their entirety.

TECHNICAL FIELD

The present disclosure generally relates to a system and method for controlling camera operations, and, more particularly, to a system and method of partial matching of settings across multiple cameras.

BACKGROUND

The amount of functions of one or more cameras that define a certain look of a scene keep growing as video technology advances. Consequently, the amount of controls that need to be matched between cameras to match the look during a live production environment also keeps growing. However, the complexity has grown significantly to the point where it has become impractical for shaders (i.e., operators of camera controls for capturing image and video data) to manually match cameras by iterating over each setting.

Simply copying all settings between cameras does not provide an effective solution, as a varying portion of the settings intentionally differ from each other. For example, when two cameras are directed at the same scene from different angles, values of settings are different to achieve the same visual result. The lens, exposure, curve or other settings may differ, but the same "look" is achieved. Simply copying all settings from one camera to another will cause the target camera to produce a different look of the scene.

Additionally, shading is often done under high mental pressure since it is often during live video production and there is no chance to redo an operational configuration, while the level of control over the circumstances of the scene varies and overall is reducing. In addition, the amount of cameras controlled by one shader can typically be around six units (e.g., six cameras) in a live production environment. This means that any tweaking typically has to be performed on six units within a small period of time to keep the overall look equal between cameras. While every parameter is important, the amount of parameters involved in matching two cameras may be as high as several hundred.

Furthermore, with the rising amount of parameters a shader must pay attention to, higher precision can now be achieved. The colors of, for example, F1 cars or team jerseys are critical to the fans. Matching these colors may easily involve more than thirty parameters at a time for image capture. As a result, copying these settings to the other cameras is an impractical operation.

SUMMARY

Thus, according to an exemplary aspect, systems and methods are disclosed that are configured to partially match settings across multiple cameras.

In general, the system comprises a plurality of cameras, including a reference camera, configured to capture one or more scenes, a camera setting controller including a partial match processor configured to execute: a grouping module configured to group one or more control elements associated with a camera into a plurality of groups, and a transfer module. The transfer module may be configured to detect a request to transfer settings from the reference camera to a target camera in the plurality of cameras, determine a look of a scene being captured by the camera that has been tagged for adjustment, retrieve a hierarchy of control elements from the plurality of groups and their settings corresponding to the look, retrieve the settings of the control elements at the reference camera, transfer the settings of the control elements to the target camera and apply the settings to the corresponding control elements in the target camera; a database of looks configured to store looks from the reference camera; and one or more displays to display output from one or more of the plurality of cameras.

In another exemplary aspect, a system is provided for partial matching of settings across cameras. In this aspect, the system includes a plurality of cameras, including a reference camera, configured to capture one or more scenes; a camera setting controller including a partial match processor configured to execute: a grouping module configured to group one or more control elements associated with a camera into a plurality of control elements groups; and a transfer module including: a settings transfer request determiner configured to detect a request to transfer settings from the reference camera to a target camera in the plurality of cameras; a look determiner configured to determine a look of a scene being captured by the camera that has been tagged for adjustment; a control elements accessing module configured to retrieve a hierarchy of control elements from the plurality of groups and their settings corresponding to the look and retrieve the corresponding settings of the control elements at the reference camera; a settings transmitter configured to transfer the settings of the control elements to the target camera; and a setting applicator configured to apply the settings to the corresponding control elements in the target camera. In addition, the system can also include a database of looks configured to store looks from the reference camera; and one or more displays to display output from one or more of the plurality of cameras.

In yet another exemplary embodiment, a system for partial matching of settings across cameras is provided that includes a plurality of cameras, including a reference camera and at least one target camera, with each camera configured to capture video content of a scene; a database configured to store a look from the reference camera; one or more displays configured to display the video content captured by one or more of the plurality of cameras; and a camera setting controller including a partial match processor configured to control one or more control elements of the at least one target camera for capturing the video content of the scene. Moreover, in this aspect, the camera setting controller includes a grouping module configured to group one or more control elements associated with the reference camera, and also includes a transfer module configured to detect a request to transfer settings from the reference camera to the at least one target camera of the plurality of cameras. In addition, the transfer module is configured to determine a look of a scene of the video content being captured by the at least one target camera; the transfer module is configured to retrieve a hierarchy of the grouped one or more control elements of the reference camera and to obtain image capture control settings that corresponding to the determined look of the scene of the video content being captured by the at least one target camera; the transfer module is configured to retrieve image capture control settings of the control elements of the reference camera that correspond to the obtained image capture control settings of the at least one target camera; and the transfer module is configured to transfer the image capture control settings of the control elements from the reference camera to the at least one target camera, such that the image capture control settings are applied to the target camera to modify the captured of the video content of the scene by the at least one target camera.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

DETAILED DESCRIPTION

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

Figure 1:
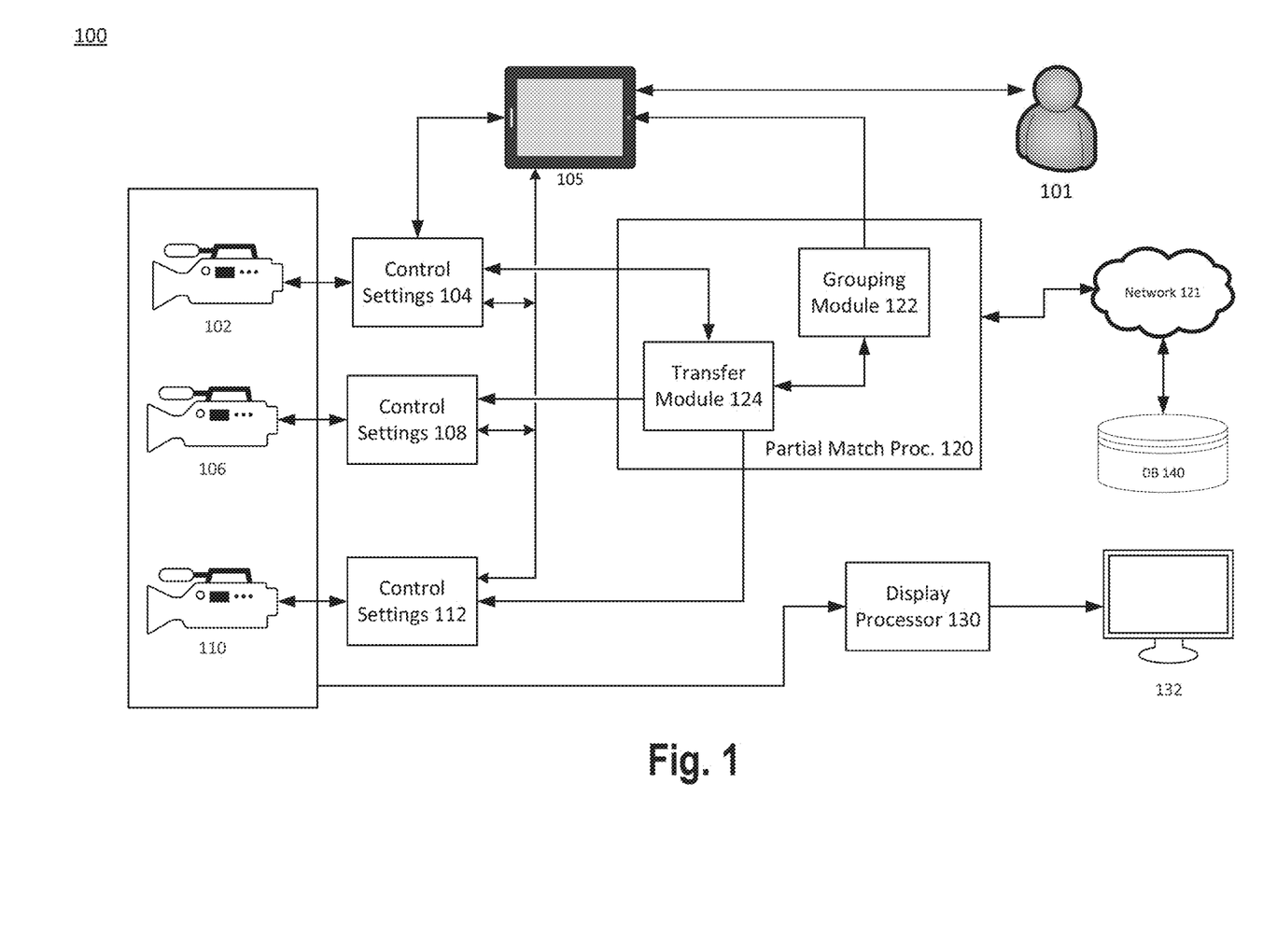
FIG. 1 is a block diagram of a system for partial matching of settings across cameras, in accordance with exemplary aspects of the present disclosure.

FIG. 1 illustrates a system 100 for partial matching of settings across cameras, in accordance with an exemplary embodiment.

As shown, the exemplary system 100 comprises a reference camera 102 (e.g., a settings control camera), target cameras 106 and 110, a control panel 105, a partial match processor 120, a display processor 130 and a display 132. Each of the cameras 102, 106 and 110 are configured to capture or film a scene(s) and output a signal (e.g., a video feed or media stream) to various displays that display the scene, in some instances live, time-delayed or a later broadcast. It should be appreciated than any of cameras 102, 106 and 110 can be selected as the reference camera and that the remaining cameras can be designated as target cameras.

According to an exemplary aspect, a shader operates the cameras 102, 106 and 110 using the control panel 105 and uses the partial match processor 120 (which can be considered a camera system settings controller) to group and copy various settings (e.g., control settings and parameters) from the reference or control camera 102 to target cameras 106 and 110 in order to match the color or other properties of the frames captured by reference camera 102. The reference camera 102 is generally the camera that produces a normalized look that the shader would like to replicate and thus can be designated by the shader in an exemplary aspect. Moreover, according to the present disclosure, a "look" refers to a recognizable impression and or representation of the scene being captured, regardless of the actual content of the scene. The look may be understood as a certain impression on a viewer that is guided by hard settings, where the settings however may differ from camera to camera. In some aspects, a reference look may be defined prior to the broadcast event, for example, when lighting for the venue or event is being determined or the like.

In exemplary aspects, the shader operating the reference camera 102 may differ from the shaders operating the target cameras 106 and 110, while in other aspects, a single shader 101 (i.e., a single camera operator) can operate all of the cameras. In some exemplary aspects, the cameras may be filming the same event, such that shader will want to match the look of the reference camera 102 in the respective target cameras 106 and/or 110. In other aspects, the reference camera 102 may be filming an entirely different event, but the target cameras may still wish to match the look of the reference camera 102. For example, a particular type of broadcast, a network station, or the like, may be assigned the same look based on reference camera 102. In some embodiments, once a particular look is achieved in the reference camera 102, it may be uploaded to a database 140 of looks through network 131. The look can then be assigned an identifier (i.e., camera setting control instructions) and retrieved by any shader or any camera to apply the associated settings. According to exemplary embodiments, the system 100 can comprise various different versions of camera models. For example, the system 100 can be one or more of high speed cameras, low speed cameras, a first version of a camera, along with a later version of that camera, that all may take different settings to output the same "look" as the reference camera. In exemplary aspects, the high speed cameras may be less sensitive than the normal speed cameras and they respond to settings adjustments differently.

According to the exemplary aspect, each camera 102, 106 and 110 has at least a portion of corresponding or overlapping settings, or control parameters that control image/video capture operation of the camera and how images/video captured by the camera appear on one or more displays, e.g., display 132. Reference camera 102 is controlled by control settings 104, target camera 106 is controlled by control settings 108 and target camera 110 is controlled by control settings 112. These control settings 104, 108 and 112 may be viewed and adjusted by shader 101 and applied to cameras by shader 101 using control panel 105. According to exemplary aspects of the present disclosure, control panel 105 can be a tablet computing device, a mobile device, a laptop computer, a desktop computer, or any device configured to display a user interface that enables adjustment and settings/parameter control of the various control settings of a camera. As noted above, while FIG. 1 shows the camera 102 as the reference camera, it is contemplated herein that the shader 101 can assign any one of the cameras as a reference camera during a broadcast, either via the control panel 105 or some other control element in system 100. The shader 101 can similarly assign any one of the cameras as a target camera for transfer.

In an exemplary aspect, the partial match processor 120 comprises a grouping module 122 and a transfer module 124. The partial match processor 120 is configured to operate the control settings for each of the cameras 102, 106 and 110. The grouping module 122 (e.g., a control setting collector) is configured to group the various control settings, e.g., all control settings 104 of camera 102, into one or more groups of camera control settings and parameters. These groups may represent distinct categories of features that are relevant to scene calibration and can define the image capture control settings for each of the plurality of cameras 102, 106 and 110.

In an exemplary aspect, these groupings may be for image capture control settings relating to sensitivity, contrast and color or the like, and can be predefined by a system operator/administrator for example. Contrast may be associated with a transfer curve between the amount of light at the input and the amount of signal on the output. Color may be associated with the color representation regardless of the other factors. The choice of which items are grouped together is predetermined, or can be developed over time in response to actual shader use, based on what the items control. The amount of settings matched or transferred to other cameras depends on the level of settings the shader is located at in the interface. If the shader is deep into a detailed color-shift parameter (e.g., Secondary Color Correction), only those elements are matched and transferred, while the coarser settings remain untouched on the other camera. However, the shader is high in the hierarchy, both the coarse and the detailed settings are matched/transferred to the target cameras.

In exemplary aspects, the grouping module 122 can be configured to aggregate those parameters that are historically changed together and use such a relationship to determine the various groups of parameters. In other words, the grouping module 122 can track and determine which parameters change when other parameters are changed at the same time or within certain predetermined time of one another (e.g., 10 seconds). Based on all such changes the grouping module 122 can then aggregate these "related" parameters.

The grouping module 122 is further configured to allow a shader 101 to view the various control settings 104 into associated groups instead of their normal order in camera processing flow. For example, all functions that influence the resulting color of the image are brought together into one group, regardless of their position in the camera processing flow. This helps the shader significantly, because all control elements for a particular category are exposed in one place, rather than scattered over the interface. Accordingly, the shader 101 can view these individual groups of associated parameters on the control panel 105 without having to dive into specific settings of the camera. In some exemplary embodiments, the groupings are predetermined at least to the extent of higher-level control elements in the hierarchy, e.g., color, iris or the like, while in others the groupings may be updated over time, or a combination of both where groupings are suggested to shaders.

Moreover, according to the exemplary aspect, the transfer module 124 is configured to receive a selection of a hierarchy of controls from one of the plurality of groups of controls specified in the control panel 105. For example, in one aspect, the shader can select an entire group of related parameters, and the transfer module 124 will detect this selection. Once the shader confirms the selection (e.g., through an on-screen control, button, physical control or the like) for transferring the parameters to target cameras 106 or 110, the transfer module 124 detects the confirmation and copies all selected control elements within a hierarchy and their values (or changes in value) to the target cameras 106 and/or 110. Prior to any transfer, however, in some aspects, each camera is normalized, e.g., by setting color temperature, exposure, position, depth of field, iris settings and the like. In some embodiments, the absolute values are not copied, but instead, the transfer module 114 transmits the copied elements and delta values to a database, to retrieve a set of delta values that would apply to the target camera to achieve the same look. The transfer module 114 then applies these delta values to the target camera.

For example, if a shader would like to copy a particular aspect of the color of the reference camera 102, the shader 101 would select the sub-elements in the color grouping on the control panel 105 and confirm that these sub-elements, or only the delta value changes for those sub-elements, will be transferred over. When copying a sub-element, all of the parameter's child elements (e.g., related or grouped elements) are also transferred to the target camera by the transfer module 124. While shading of cameras remains relatively manual given the spontaneous nature of live television (e.g., sports, racing or the like), it is contemplated herein that the partial match processor 120 can be configured to determine the types of contents, angles of view and the like, and correlate this information with the transferring of particular control elements from a reference camera for future broadcasts. Furthermore, those elements that impact the "look" of the scene that are outside of the particular hierarchy that has been selected for transfer, are not transferred at all, and remain the same. This is particularly relevant for systems that may include older cameras and newer cameras, cameras with different sensitivities and the like, so copying all absolute values of settings is not particularly valuable; instead the changes in control settings are mapped based on the type of the target camera and the version of the target camera, though other considerations are also contemplated herein. For example, if the shader decides to map all parameters that relate to the color of the scene form the control settings 104 of the reference camera 102 to the control settings 112 of the target camera 110, then other parameters such as sensitivity and contrast are not affected in the target cameras, but the desired look is achieved.

According to an exemplary aspect, the transfer module can be configured from a number of components, such as a combination of software and/or hardware modules, configured to perform the algorithms described herein. For example, the transfer module can include a settings transfer request determiner that is configured to detect a request to transfer settings from the reference camera to a target camera in the plurality of cameras. Moreover, a look determiner is provided to determine a look of a scene being captured by the camera that has been tagged for adjustment. The transfer module can further include a control elements accessing module configured to retrieve a hierarchy of control elements from the plurality of groups and their settings corresponding to the look and retrieve the corresponding settings of the control elements at the reference camera; a settings transmitter configured to transfer the settings of the control elements to the target camera; and a setting applicator configured to apply the settings to the corresponding control elements in the target camera.

Figure 2:
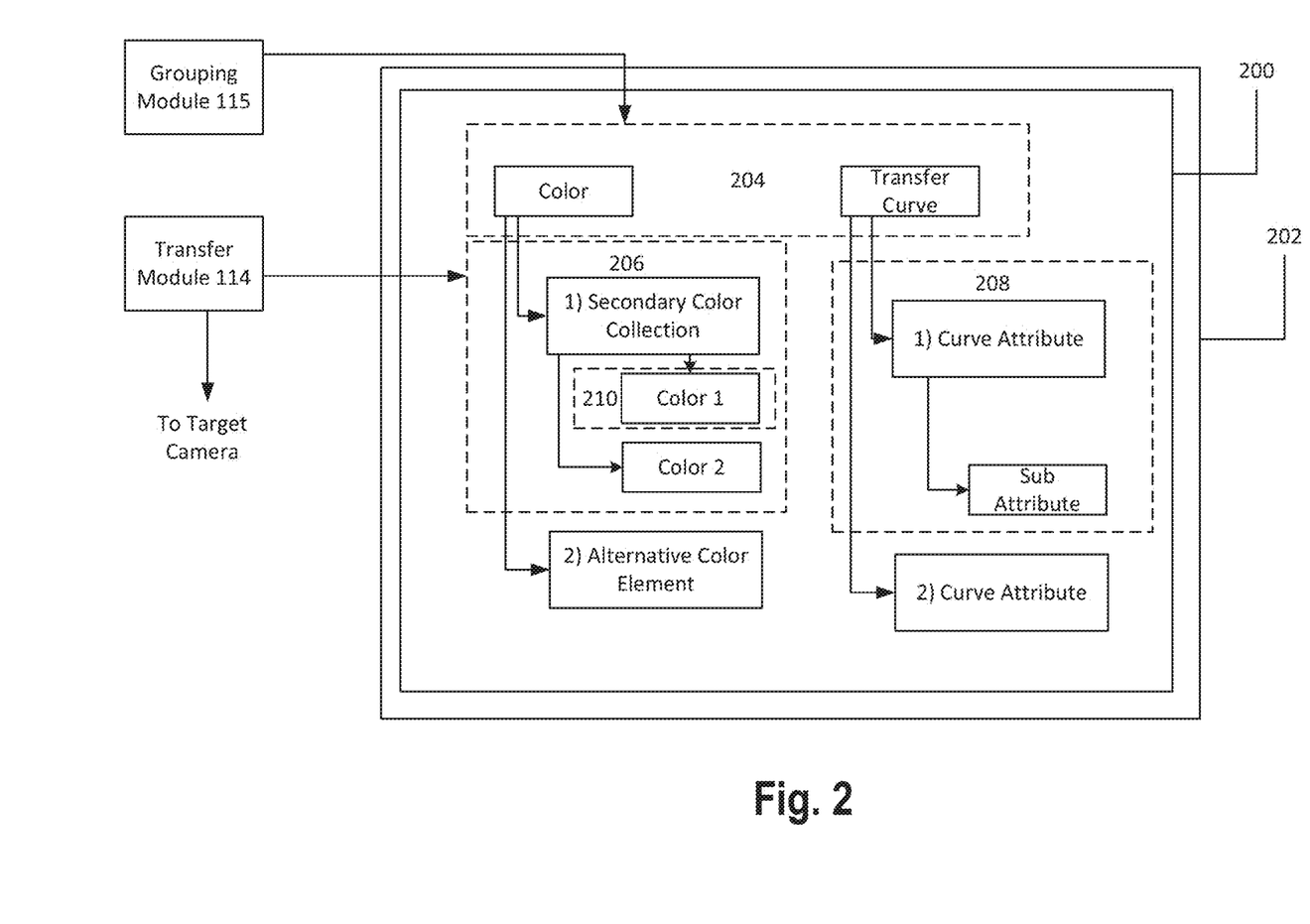
FIG. 2 is an illustration of a grouping of controls in accordance with exemplary aspects of the present disclosure.

FIG. 2 illustrates a panel 202 for displaying control settings of the cameras, in accordance with an exemplary embodiment.

The panel 202 is an example of the control panel 105, displaying a user interface 200 for modifying, grouping and transferring control or sets of controls from a reference camera (e.g., reference camera 102) to a target camera (e.g., target camera 106 and/or target camera 110).

According to the exemplary aspect, the user interface 200 is configured to display two exemplary groupings 204, color and transfer curve. Each of these groupings contains a hierarchy of parameters that affect this particular aspect of the look of a scene. The grouping module 115 generates the groupings 204 along with the hierarchies of controls contained therein. It should be appreciated that while only the color and transfer curve groupings are shown in this example, other groupings can be provided as would be appreciated to one skilled in the art.

In an exemplary aspect, one of the elements 206 within the color group hierarchy is "Secondary Color Correction", which can be used by a shader to precisely adjust colors to, for example, match F1 vehicle colors, or team colors in sporting events or the like. At the top-level of this Secondary Color Correction, the operator can navigate down into each of the sets, where the colors can be further adjusted as desired.

The "Transfer Curve" can include a hierarchy of elements including the curve attribute 208, which may further contain a sub-attribute. Furthermore, the Transfer Curve may contain a plurality of curve attributes that can be modified, and are generally associated with the transfer curve. These elements illustrated in FIG. 2 are merely exemplary, however, and many more elements may fall within the described hierarchies.

When a shader is comparing two cameras (e.g., the reference camera 102 and the target camera 106) and the element of the image that stands out as being different is color, the user interface 200 offers a way to transfer all color-related settings (e.g., the entire group, or the sub-element 206 alone) from the reference camera to the deviating camera in one action, without changing any of the other visual elements, e.g., affecting the transfer curve, or curve attribute 208.

However, when the overall colors between the two cameras do match (which may be the result of a different value for many of the parameters), but only the adjusting of the team colors needs to be applied, the operator dives down to the top-level of Secondary Color Correction, where the transfer module 114 is configured to only transfer the detailed set-up of the underlying Secondary Color Corrector parameters (e.g., element 210 only) to target cameras. As a result, based on the hierarchical position in the interface, less or more functions are being transferred from the reference camera to the target camera, based on the shader's expert knowledge regarding the difference between the two cameras.

Figure 3:
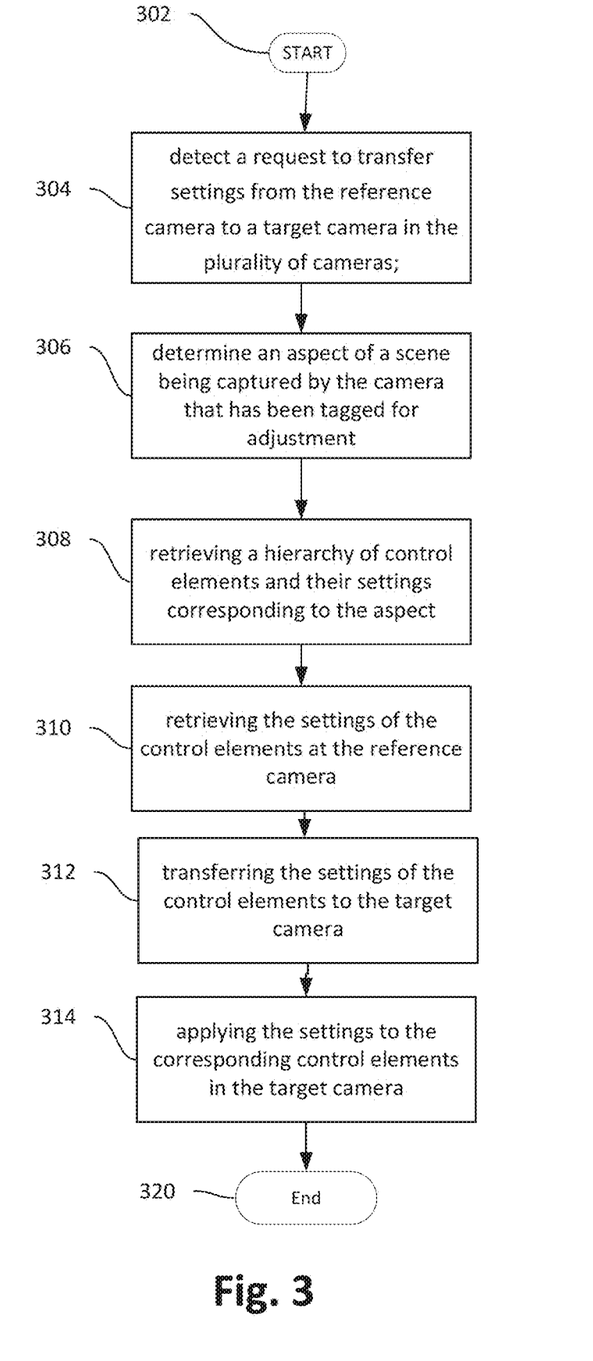
FIG. 3 is a flow diagram of a method for partial matching of settings across cameras, in accordance with exemplary aspects of the present disclosure.

FIG. 3 is a flow diagram of a method 300 for partial matching of settings in cameras, in accordance with exemplary aspects of the present disclosure.

The method 300 begins at step 302 at which point a shader(s) may begin image/video capture using one or a plurality of cameras 102, 106, and 110, for example. Next, the method proceeds to step 304 at which point the partial match processor 120 detects a request to transfer settings from the reference camera (e.g., camera 102) to one or more target cameras (e.g., cameras 106 and/or 110). In some instances, a shader can dynamically designate (e.g., using interface 105) which camera(s) is configured as the reference camera and which cameras are target cameras, and these designations may change during a broadcast. Moreover, the request to transfer settings can be driven by the shader or automatically generated by one or more target cameras sending a setting request to the reference camera.

The method then proceeds to 306, wherein the transfer module 114 determines that an aspect of the scene being captured by the one or more cameras has been tagged for adjustment. For example, the shader 101 may indicate that specific colors must be matched, invoking secondary color correction as shown in FIG. 2, or that a specific type of transfer curve must be matched. Thus, the shader 101 can identify (e.g., tag) one or more camera control parameters using interface 105/200, for example, to be adjusted. In another aspect, the cameras (i.e., the reference/control camera and the target camera(s)) can be configured to automatically tag the scene aspects for adjustment. For example, one or both of the cameras can be configured to received (in real time) image/video capture data and compare the respective captured data with each other. If one or more parameters (e.g., color) of the target camera does not match (or is outside a predetermined threshold) from the corresponding parameter of the reference camera, these one or more parameters can be "tagged" as requiring adjustment.

Using the tagged control information, at step 308, the transfer module 114 retrieves a hierarchy of control elements and their settings corresponding to the tagged aspect from the user interface 200 displayed in panel 105, for example.

The method then proceeds to 310 where the transfer module 114 retrieves the settings of the control elements from the reference camera. The transfer module 114 observes the selected hierarchy and extracts these particular settings from the control settings of the reference camera, e.g., control settings 104 of reference camera 102.

The method then proceeds to 312, when the transfer module 114 automatically transfers the settings of the control elements to the target camera. The extracted settings from the control settings 104 corresponding to the controls identified in the hierarchy are transferred to, for example, one or more target cameras such as target camera 106.

The method then proceeds to 314, when the transfer module 114 automatically applies the settings to the corresponding control elements in the target camera. In some aspects, applying the settings comprises mapping deltas of value changes to the values of the control elements in the target camera. In some aspects, instead of applying the settings immediately to the control elements of the target camera, the transfer module 114 copies over the settings to the control panel 105 and displays the camera settings of the target camera, so the shader 101 may adjust them further, prior to applying the settings to the target camera. Finally, the method terminates at 320.

Figure 4:
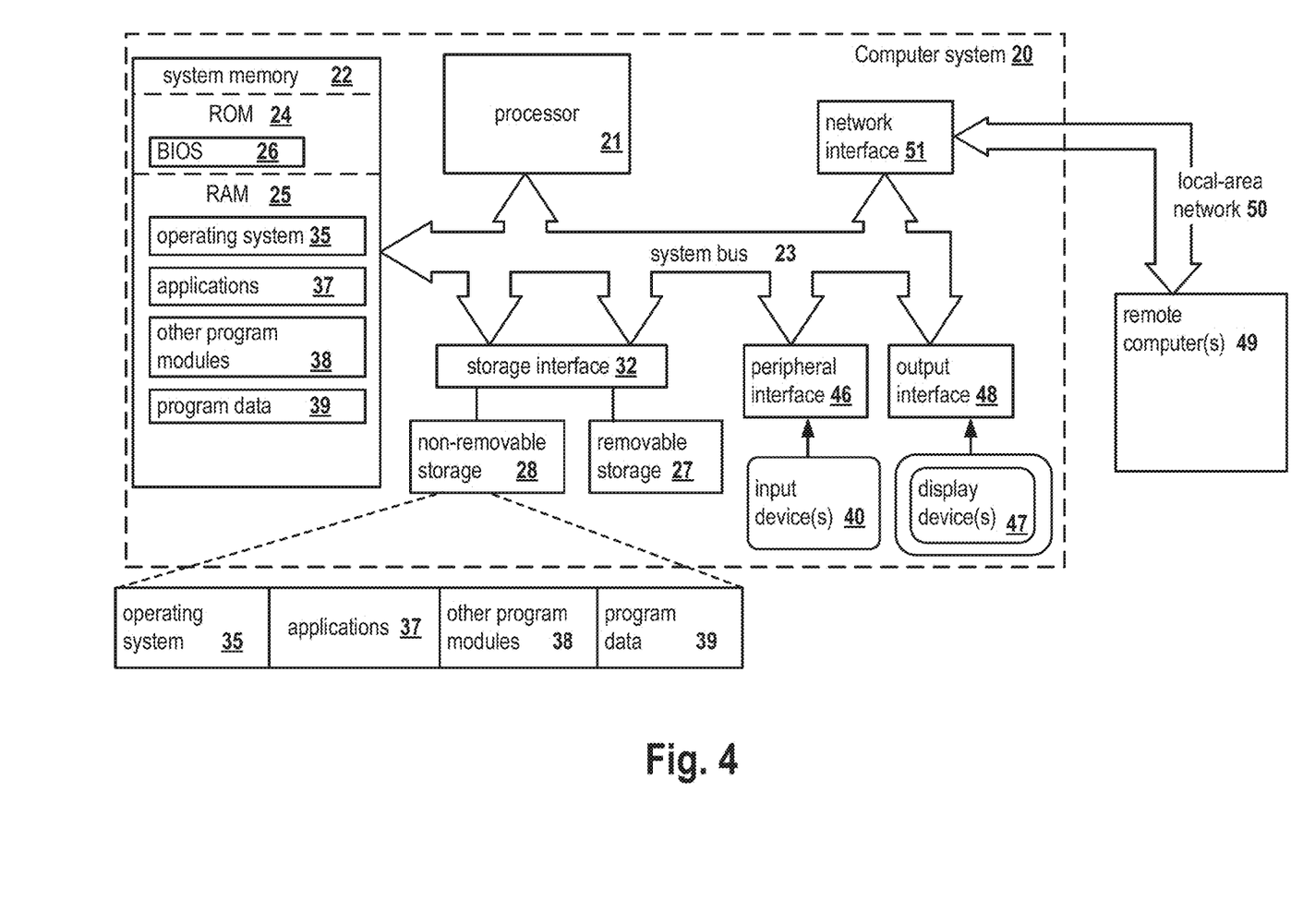
FIG. 4 is a block diagram illustrating a computer system on which aspects of systems and methods for partially matching settings across multiple cameras may be implemented in accordance with an exemplary aspect.

FIG. 4 is a block diagram illustrating a computer system 20 on which aspects of systems and methods for partial match of settings across multiple cameras may be implemented in accordance with an exemplary aspect. It should be noted that the computer system 20 can correspond to the partial match processor 120 or the panel 105, for example. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for partial matching of settings across cameras, the system comprising:
   a camera setting controller configured to control a control element of a target camera for capturing video content of a scene;
   a look determiner configured to determine a representation of the scene of the video content being captured by the target camera;
   a transfer module configured to:
     receive a request to transfer settings from a reference camera to the target camera,
     retrieve one or more control elements of the reference camera in response to the received request and to obtain image capture control settings associated with the one or more control elements corresponding to the determined representation of the scene being captured by the target camera, and
     transmit the obtained image capture control settings to the target camera, such that the image capture control settings are applied to the target camera to modify the control element for capturing the video content of the scene by the target camera; and
   a user interface configured to receive a user input to transfer the image capture control settings from the reference camera to the target camera, with the user input controlling the one or more control elements related to the image capture control settings of the reference camera.

2. The system according to claim 1, wherein the user interface is further configured to receive a user input to control the control element of the target camera.

3. The system according to claim 1, further comprising a grouping module configured to group the one or more control elements related to the image capture control settings of the reference camera.

4. The system according to claim 3, wherein the transfer module is configured to retrieve a hierarchy of the grouped one or more control elements in order to retrieve the image capture control settings of the reference camera.

5. The system according to claim 3, wherein the grouping module is configured to group one or more control elements relating to the image capture control settings including sensitivity, contrast and color for the capture of video content by the reference camera.

6. The system according to claim 3, wherein the user interface is further configured to receive a user input to control the grouping module to group the one or more control elements relating to image capture control settings.

7. The system according to claim 1, wherein other visual elements related to the capture of video content by the target camera are not changed by application of the transferred image capture control settings from the reference camera to the target camera.

8. The system according to claim 1, further comprising one or more displays configured to display the video content captured by one or more of the reference camera and the target camera.

9. A system for partial matching of settings across cameras, the system comprising:
   a camera setting controller configured to control a control element of a target camera for capturing video content of a scene;
   a look determiner configured to determine a scene representation of the video content being captured by the target camera;
   a transfer module configured to:
     receive a request to transfer settings from a reference camera to the target camera,
     in response to the received request, obtain image capture control settings associated with one or more control elements corresponding to the determined scene representation being captured by the target camera, and transfer the obtained image capture control settings to the target camera, such that the image capture control settings are applied to the target camera to modify the control element for capturing the video content of the scene by the target camera; and a user interface configured to control the one or more control elements related to the image capture control settings of the reference camera.

10. The system according to claim 9, further comprising a grouping module configured to group the one or more control elements related to the image capture control settings of the reference camera.

11. The system according to claim 10, wherein the transfer module is configured to retrieve a hierarchy of the grouped one or more control elements in order to retrieve the image capture control settings of the reference camera.

12. The system according to claim 10, wherein the grouping module is configured to group one or more control elements relating to the image capture control settings including sensitivity, contrast and color for the capture of video content by the reference camera.

13. The system according to claim 10, wherein the user interface is further configured to receive a user input to control the grouping module to group the one or more control elements relating to image capture control settings.

14. The system according to claim 9, wherein other visual elements related to the capture of video content by the target camera are not changed by application of the transferred image capture control settings from the reference camera to the target camera.

15. The system according to claim 9, further comprising one or more displays configured to display the video content captured by one or more of the reference camera and the target camera.

16. A system for partial matching of settings across cameras, the system comprising:

means for controlling a control element of a target camera for capturing video content of a scene;

means for determining a representation of the scene of the video content being captured by the target camera;

means for receiving a request to transfer settings from a reference camera to the target camera;

means for retrieving one or more control elements of the reference camera in response to the received request;

means for obtaining image capture control settings associated with the one or more control elements corresponding to the determined representation of the scene being captured by the target camera;

means for transmitting the obtained image capture control settings to the target camera, such that the image capture control settings are applied to the target camera to modify the control element for capturing the video content of the scene by the target camera; and a user interface configured to control the one or more control elements related to the image capture control settings of the reference camera.

17. The system according to claim 16, further comprising means for grouping the one or more control elements related to the image capture control settings of the reference camera.

18. The system according to claim 17, further comprising means for retrieving a hierarchy of the grouped one or more control elements in order to retrieve the image capture control settings of the reference camera.

19. The system according to claim 17, further comprising means for grouping one or more control elements relating to the image capture control settings including sensitivity, contrast and color for the capture of video content by the reference camera.

20. The system according to claim 16, wherein other visual elements related to the capture of video content by the target camera are not changed by application of the transferred image capture control settings from the reference camera to the target camera.

* * * * *

UNITED STATES PATENT AND TRADEMARK OFFICE
CERTIFICATE OF CORRECTION

| | | |
|---|---|---|
| PATENT NO. | : 11,489,997 B2 | Page 1 of 1 |
| APPLICATION NO. | : 17/448815 | |
| DATED | : November 1, 2022 | |
| INVENTOR(S) | : Martinus Wilhelmus Cornelis van Geel et al. | |

It is certified that error appears in the above-identified patent and that said Letters Patent is hereby corrected as shown below:

On the Title Page

Under (*) Notice please insert the following:
-- This patent is subject to a Terminal Disclaimer. --

Signed and Sealed this
Third Day of January, 2023

Katherine Kelly Vidal
*Director of the United States Patent and Trademark Office*